United States Patent
Itoh et al.

(10) Patent No.: US 6,730,709 B2
(45) Date of Patent: May 4, 2004

(54) BIODEGRADABLE RECYCLED POLYESTER RESIN AND PRODUCTION PROCESS THEREFOR

(75) Inventors: Hiroshi Itoh, Kobe (JP); Kazumi Fujioka, Ibo-gun (JP)

(73) Assignee: Nippon Shokubai Co., Ltd., Osaka (JP)

( * ) Notice: Subject to any disclaimer, the term of this patent is extended or adjusted under 35 U.S.C. 154(b) by 273 days.

(21) Appl. No.: 09/864,813

(22) Filed: May 24, 2001

(65) Prior Publication Data

US 2002/0006973 A1 Jan. 17, 2002

(30) Foreign Application Priority Data

May 30, 2000 (JP) .................................... 2000-159816

(51) Int. Cl.$^7$ ................................................. C08J 11/04
(52) U.S. Cl. ........................................ 521/48; 521/48.5
(58) Field of Search .................................. 521/48.5, 48

(56) References Cited

U.S. PATENT DOCUMENTS 5,484,861 A * 1/1996 Ihm et al. ................... 525/450

FOREIGN PATENT DOCUMENTS

| EP | 0 622 390 A2 | 11/1994 |
|---|---|---|
| EP | 0 723 984 A1 | 7/1996 |
| JP | 5-279446 A | 10/1993 |
| JP | 7-157553 A | 6/1995 |
| JP | 9-3180 A | 1/1997 |
| JP | 9-328554 A | 12/1997 |
| JP | 11-106527 A | 4/1999 |
| JP | 3122659 B1 | 10/2000 |
| JP | 2001-81166 A | 3/2001 |
| JP | 2001-081166 * | 3/2001 |
| KR | 94-9418 B1 | 10/1994 |

OTHER PUBLICATIONS

Malinconico et al., "PET Recycling, Part I: PET/PCL Blends Extruded in the Presence of Compatibilising Agents," Polymer Recycling, vol. 3, No. 4 (1997/98) (XP–000926712).

Lim et al., "The effect of morphology on the biodegradation of PET and polycaprolactone," J. Korean Fiber Soc., (2000), 37(1), 1–10 (XP–002183953) (abstract only).

Yoo et al., "Morphology and Degradation Behavior of Aliphatic/Aromatic Copolyesters," Macromol. Symp., 118, 739–745 (1997) (XP 000698071).

Tokiwa et al., "Hydrolysis of Copolyesters Containing Aromatic and Aliphatic Ester Blocks by Lipase," Journal of Applied Science, vol. 26, 441–448 (1981) (XP–002183950).

Kang et al., "Characterization and Biodegradability of Poly(butylene) adipate–co–succinate)/Poly(butyleneterephthalate) Copolyester," Journal of Applied Polymer Science, vol. 72, 593–608 (1999) (XP–002183951).

Maeda et al., "Synthesis and Characterization of Novel Biodegradable Copolyesters by Transreaction of Poly(ethylene terephthalate) with Copoly(Succinic anhydride/ethylene oxide), " Journal of Polymer Science: Part A, Polymer Chemistry, vol. 38, 4478–4489 (2000) (XP–002183952).

* cited by examiner

Primary Examiner—Edward J. Cain
Assistant Examiner—Katarzyna Wyrozebski
(74) Attorney, Agent, or Firm—Haugen Law Firm PLLP

(57) ABSTRACT

The present invention provides a biodegradable recycled polyester resin and a production process therefor, wherein the polyester resin is inexpensive and economical due to use of recycled aromatic polyesters, and further, can solve problems of wastes by affording biodegradability to the aromatic polyester which has so far been assumed to have no biodegradability. The biodegradable recycled polyester resin, according to the present invention, is obtained by a process including the step of carrying out a reaction of a recycled aromatic polyester (A) with an aliphatic polyester (B) having a number-average molecular weight of 3,000 to 300,000 in a reaction ratio (weight ratio) of (A)/(B)=95/5 to 5/95, thereby affording biodegradability to the recycled aromatic polyester (A).

5 Claims, No Drawings

BIODEGRADABLE RECYCLED POLYESTER RESIN AND PRODUCTION PROCESS THEREFOR

BACKGROUND OF THE INVENTION

A. Technical Field

The present invention relates to a biodegradable polyester resin and a production process therefor, wherein the polyester resin is obtained by utilizing a recycled aromatic polyester. More specifically, the invention relates to a biodegradable polyester resin and a production process therefore, wherein the polyester resin is obtained by a reaction of a recycled aromatic polyester with a specific aliphatic polyester.

B. Background Art

Aromatic polyesters have good mechanical strength, thermal properties, humidity properties, transparency, and many other excellent properties. Therefore, they are used in wide fields such as fibers, molding materials, wrapping materials, and magnetic recording materials. In addition, a demand for the aromatic polyesters is more and more increasing due to their excellent characteristics in recent years, and with this increase of the demand, the amount of waste aromatic polyesters increases so sharply as to cause social problems.

However, because the aromatic polyesters generally have no biodegradability and therefore do not putrefy, disposition thereof by embedding them into lands wants places therefor, and further, disposition of the aromatic polyesters by incineration has such as problems of doing damage to incinerators due to high heat of combustion. As means to solve these problems, attempts are made to recover and recycle used aromatic polyesters. However, the number of times of the recycling is naturally limited, and the disposition must be carried out sooner or later, therefore the fundamental solution of the problems has not been attained yet.

SUMMARY OF THE INVENTION

A. Object of the Invention

An object of the present invention is to provide a biodegradable recycled polyester resin and a production process therefor, wherein the polyester resin is inexpensive and economical due to use of recycled aromatic polyesters, and further, can solve problems of wastes by affording biodegradability to the aromatic polyester which has so far been assumed to have no biodegradability.

B. Disclosure of the Invention

Thus, to solve the above-mentioned problems, the present inventors diligently studied about whether or not the aromatic polyester itself, which has so far been assumed to generally have no biodegradability, could be caused to biodegrade.

First of all, the inventors made an attempt to blend the aromatic polyester with a biodegradable aliphatic polyester. However, in this case, only the aliphatic polyester portions biodegraded, and the aromatic polyester did not, therefore the fundamental solution of the problems was not attained.

Thus, instead of the above simple blending, the inventors caused the aromatic polyester to react with the aliphatic polyester by a specific method and to thereby constitute a molecular structure such that the aromatic polyester and the aliphatic polyester were arranged in a block form. As a result, the inventors have found out that, surprisingly, even the aromatic polyester portions, which have so far been assumed not to biodegrade, do biodegrade.

That is to say, a biodegradable recycled polyester resin, according to the present invention, is obtained by a process including the step of carrying out a reaction of a recycled aromatic polyester (A) with an aliphatic polyester (B) having a number-average molecular weight of 3,000 to 300,000 in a reaction ratio (weight ratio) of (A)/(B)=95/5 to 5/95, thereby affording biodegradability to the recycled aromatic polyester (A).

In addition, a production process for a biodegradable recycled polyester resin, according to the present invention, comprises the step of carrying out a melting reaction of a recycled aromatic polyester (A) with an aliphatic polyester (B) in a heated state in a reaction ratio (weight ratio) of (A)/(B)=95/5 to 5/95, wherein the aliphatic polyester (B) has a number-average molecular weight of 3,000 to 300,000.

These and other objects and the advantages of the present invention will be more fully apparent from the following detailed disclosure.

DETAILED DESCRIPTION OF THE INVENTION

Examples of the recycled aromatic polyester (A) as used in the present invention include: a material with a hysteresis of having been passed through a molding machine or spinning apparatus in a heat-melted state; and a recovered (recycled) product formed from a virgin raw material in such as polyester production facilities; and further a product obtained by a process including the step of causing the above recovered (recycled) product to further react with a multifunctional acid anhydride, such as pyromellitic dianhydride, or a multifunctional epoxy compound. The above recovered (recycled) product is favorably used in the form pulverized into the size of 0.1 to 20 mm.

A polyester comprising such a recycled aromatic polyester (A) is obtained mainly from terephthalic acid and a glycol having at least two carbon atoms by conventional methods. Examples of polybasic acids other than terephthalic acid include isophthalic acid, 2,6-naphthalenedicarboxylic acid, 1,4-naphthalenedicarboxylic acid, diphenyldicarboxylic acid, diphenoxyethanedicarboxylic acid, diphenylsulfonedicarboxylic acid, and diphenyl ether dicarboxylic acid. These polybasic acids may be copolymerized with the above raw materials in small ratios. Examples of the glycol having at least two carbon atoms include ethylene glycol, propylene glycol, 1,3-propanediol, 1,4-butanediol, neopentyl glycol, 1,5-pentanediol, 1,6-hexanediol, and decamethylene glycol. Of these, a combination of terephthalic acid with ethylene glycol or 1,4-butanediol is favorable in consideration of the melting point of the resulting aromatic polyester and the economical advantages.

The above aromatic polyesters may be polyesters obtained by further copolymerization with a small quantity of at least one kind of trifunctional or more multifunctional compound such as pyromellitic dianhydride, benzophenonetetracarboxylic dianhydride, trimethylolpropane, and pentaerythritol, if necessary.

If necessary, the polyester as obtained in the above way may be converted into a high-molecular one by a further reaction with various chain-extending agents.

The method involving the above reaction with the chain-extending agent has industrial disadvantages in that: the process involves many steps; unreacted chain-extending agents have an bad influence on safety or cause changes of properties with the passage of time; and the used chain-extending agents cause fisheyes in films. Examples of the chain-extending agents include the below-mentioned ones such as isocyanates, epoxides, aziridines, oxazolines, multivalent metal compounds, multifunctional acid anhydrides, phosphate esters, and phosphite esters. These can be used either alone respectively or in combinations with each other.

The specific process for producing the aliphatic polyester (B) as used in the present invention is not especially limited, but, usually, examples of the process for obtaining the aliphatic polyester resin include:

(i) a process which involves polycondensation of a polybasic acid (or its ester) with a glycol;

(ii) a process which involves polycondensation of a hydroxycarboxylic acid (or its ester);

(iii) a process which involves ring-opening polymerization of a cyclic acid anhydride with a cyclic ether; and (iv) a process which involves ring-opening polymerization of a cyclic ester.

Examples of the polybasic acid as used in the above process (i) include succinic acid, adipic acid, suberic acid, sebacic acid, azelaic acid, decanedicarboxylic acid, octadecanedicarboxylic acid, dimer acid, and their esters. Examples of the glycol include ethylene glycol, propylene glycol, 1,3-propanediol, 1,4-butanediol, neopentyl glycol, 1,5-pentanediol, 1,6-hexanediol, and decamethylene glycol. In addition, it is also possible to use polyoxyalkylene glycol as a part of the glycol component. Examples of this polyoxyalkylene glycol include polyoxyethylene glycol, polyoxypropylene glycol, polyoxytetramethylene glycol, and their copolymers. Of these, a combination of succinic acid with ethylene glycol and/or 1,4-butanediol is favorable in consideration of the melting point and biodegradability of the resulting aliphatic polyester (B) and the economical advantages. When the aliphatic polyester (B) is produced, the polybasic acid (or its ester) component and the glycol component may initially be mixed all together at once to carry out a reaction therebetween, or may be added in lots with the progress of the reaction. The polycondensation reaction can be carried out not only by conventional transesterification or esterification methods, but also by their combinations. In addition, if necessary, the polymerization degree can be raised by putting the inside of the reactor under increased or reduced pressure. The transesterification reaction usually needs to involve the use of a small quantity of catalyst. If the catalyst is a conventional one, the catalyst is not especially limited, but examples thereof include organometallic compounds, organic acid salts, metal alkoxides, metal oxides, metal hydroxides, carbonate salts, phosphate salts, sulfate salts, nitrate salts, and chlorides of such as Ti, Ge, Zn, Fe, Mn, Co, Zr, Hf, V, Ir, La, Ce, Li, Ca, Mg, Sn, Ba, and Ni. The amount of the catalyst as used is usually in the range of 0.001 to 5 parts by weight, favorably 0.01 to 0.5 part by weight, per 100 parts by weight of the resulting aliphatic polyester (B).

Examples of the hydroxycarboxylic acid as used in the above process (ii) include glycolic acid, lactic acid, 3-hydoxypropionic acid, 3-hydroxy-2,2-dimethylpropionic acid, 3-hydroxy-3-methyl-butyric acid, 4-hydroxybutyric acid, 5-hydroxyvaleric acid, 3-hydroxybutyric acid, 3-hydroxyvaleric acid, 4-hydroxyvaleric acid, 6-hydroxycaproic acid, citric acid, malic acid, and their esters. There is no problem even if the polycondensation reaction is carried out by conventional transesterification or esterification methods, or even by their combinations. In addition, if necessary, the polymerization degree can be raised by putting the inside of the reactor under increased or reduced pressure.

Examples of the cyclic acid anhydride as used in the above process (iii) include succinic anhydride, maleic anhydride, itaconic anhydride, glutaric anhydride, adipic anhydride, and citraconic anhydride. Examples of the cyclic ether include ethylene oxide, propylene oxide, cyclohexene oxide, styrene oxide, epichlorohydrin, allyl glycidyl ether, phenyl glycidyl ether, tetrahydrofuran, oxepane, and 1,3-dioxolane. Of these, a combination of succinic anhydride with ethylene oxide is favorable in consideration of the melting point and biodegradability of the resulting aliphatic polyester (B) and the economical advantages. The ring-opening polymerization can be carried out with conventional ring-opening polymerization catalysts by methods such as polymerization in solvents and bulk polymerization.

Examples of the cyclic ester as used in the above process (iv) include β-propiolactone, β-methyl-β-propiolactone, δ-valerolactone, ε-caprolactone, glycolide, and lactide. The ring-opening polymerization can be carried out with conventional ring-opening polymerization catalysts by methods such as polymerization in solvents and bulk polymerization.

Of such processes for obtaining the aliphatic polyester (B), the above process (iii) which involves the ring-opening polymerization of the cyclic acid anhydride with the cyclic ether is favorable as a process which enables the production with industrially good efficiency in a comparatively short time. Hereinafter, the ring-opening polymerization of the cyclic acid anhydride with the cyclic ether is explained in more detail.

It has been known so far that the cyclic acid anhydride as used in the present invention, such as succinic anhydride, does not homopolymerize.

However, if such a cyclic acid anhydride as does not homopolymerize is polymerized with the cyclic ether by gradually adding the cyclic ether to the cyclic acid anhydride in the presence of the polymerization catalyst, then the aliphatic polyester (B) can be formed in a short time by substantially alternating copolymerization of an acid component and an alcohol component.

The polymerization can be carried out by methods such as polymerization in solvents and bulk polymerization. When the polymerization in solvents is carried out, the cyclic acid anhydride is dissolved into solvents and then used for the present invention. When the bulk polymerization is carried out, the cyclic acid anhydride is melted and then used for the present invention.

The polymerization in solvents can be carried out either batchwise or continuously. Examples of the solvents as used in this polymerization include inert solvents such as benzene, toluene, xylene, cyclohexane, n-hexane, dioxane, chloroform, and dichloroethane.

The polymerization catalyst is not especially limited, but those which are used conventionally for ring-opening polymerization of polyesters are used. Examples thereof include: metal alkoxides such as tetramethoxyzirconium, tetraethoxyzirconium, tetra-iso-propoxyzirconium, tetra-iso-butoxyzirconium, tetra-n-butoxyzirconium, tetra-t-butoxyzirconium, triethoxyaluminum, tri-n-propoxyaluminum, tri-iso-propoxyaluminum, tri-n-butoxyaluminum, tri-iso-butoxyaluminum, tri-sec-butoxyaluminum, mono-sec-butoxy-di-iso-propoxyaluminum, ethyl acetoacetate aluminum diisopropylate, aluminum tris(ethyl acetoacetate), tetraethoxytitanium, tetra-iso-propoxytitanium, tetra-n- propoxytitanium, tetra-n-butoxytitanium, tetra-sec-butoxytitanium, tetra-t-butoxytitanium, tri-iso-propoxygallium, tri-iso-propoxyantimony, tri-iso-butoxyantimony, trimethoxyboron, triethoxyboron, tri-iso-propoxyboron, tri-n-propoxyboron, tri-iso-butoxyboron, tri-n-butoxyboron, tri-sec-butoxyboron, tri-t-butoxyboron, tetramethoxygermanium, tetraethoxygermanium, tetra-iso-propoxygermanium, tetra-n-propoxygermanium, tetra-iso-butoxygermanium, tetra-n-butoxygermanium, tetra-sec-butoxygermanium, and tetra-t-butoxygermanium; halides such as antimony pentachloride, zinc chloride, lithium bromide, tin(IV) chloride, cadmium chloride, and boron trifluoride-diethyl ether; alkylaluminums such as trimethylaluminum, triethylaluminum, diethylaluminum chloride, ethylaluminum dichloride, and tri-iso-butylaluminum; alkylzincs such as dimethylzinc, diethylzinc, and diisopropylzinc; tertiary amines such as triallylamine, triethylamine, tri-n-octylamine, and benzyldimethylamine; heteropolyacids, such as phosphotungstic acid, phosphomolybdic acid, and silicotungstic acid, and their alkaline metal salts; and zirconium compounds such as zirconium oxychloride, zirconyl octylate, zirconyl stearate, and zirconyl nitrate. Of these, particularly, zirconyl octylate, tetraalkoxyzirconiums, and trialkoxyaluminum compounds are favorable. The amount of the polymerization catalyst as used is not especially limited, but is usually in the range of 0.001 to 10 weight % of the total of the cyclic acid anhydride and the cyclic ether. As to how to add the polymerization catalyst, it may be added to the cyclic acid anhydride beforehand, or added gradually similarly to the cyclic ether.

With respect to the polymerization temperature, there is no especial limitation if the polymerization temperature is that at which the cyclic acid anhydride reacts with the cyclic ether. However, the polymerization temperature is usually in the range of 10 to 250° C., favorably 50 to 150° C., more favorably 100 to 150° C. When the reaction is carried out, the pressure in the reactor is different according to the reaction temperature, the presence or absence of solvent, and the sort of the solvent. However, the increase of an unreacted cyclic ether with the rise of pressure due to the gradual addition of the cyclic ether has the disadvantage of increasing the polyether content of the reaction product. Therefore, the cyclic ether is added in such a way that the pressure in the reactor may be favorably in the range of normal pressure to 4.90 MPa, more favorably normal pressure to 1.47 MPa.

The gradual addition of the cyclic ether is carried out at a rate of favorably 3 to 90 parts by weight, more favorably 5 to 50 parts by weight, of the cyclic ether to 100 parts by weight of the cyclic acid anhydride per hour.

In the case where the rate of the addition of the cyclic ether is slower than the lower limit of 3 parts by weight, there are industrial disadvantages in that, for example, the reaction needs such a long time as to deteriorate the productivity. In addition, in the case where the rate of the addition of the cyclic ether is faster than the upper limit of 90 parts by weight, the polyether content of the reaction product increases so much as to obtain only an aliphatic polyester having a low melting point.

Incidentally, the gradual addition of the cyclic ether means not adding the cyclic ether all at once, and its way may be either continuous dropwise addition or intermittent addition divided into a plurality of steps. Favorably, the continuous addition is carried out in such a way that the amount of the addition may not greatly vary with the passage of time.

The reaction ratio between the cyclic acid anhydride and the cyclic ether in the present invention is favorably adjusted into the range of 40/60 to 60/40 by mol, and this molar ratio is adjusted into the range of 40/60 to 49/51 more favorably for excessively adding the cyclic ether in consideration that the terminal carboxyl groups of the residual cyclic acid anhydride and the resultant aliphatic polyester deteriorate the properties of the aliphatic polyester. If such adjustment is made, less than 50% of all terminals of the resultant aliphatic polyester terminate in a carboxyl group, so that the heat resistance is enhanced.

In the case where the reaction ratio deviates from the above range, the unreacted monomers might increase so much as to lower the yield. In the present invention it is favorable that after the gradual addition of a definite amount of cyclic ether as predetermined in consideration of the aforementioned molar ratio has been completed, the polymerization is continued at the aforementioned reaction temperature to carry out aging. After this aging reaction, the resultant aliphatic polyester may be separated from the polymerization system.

If necessary, the aliphatic polyester as obtained by any of the aforementioned processes (i), (ii), (iii) and (iv) may also be converted into a high-molecular one either by a further transesterification reaction or by a further reaction with various chain-extending agents.

The method involving the above reaction with the chain-extending agent has industrial disadvantages in that: the process involves many steps; unreacted chain-extending agents have an bad influence on safety or cause changes of properties with the passage of time; and the used chain-extending agents cause fisheyes in films.

Examples of the chain-extending agents include isocyanates, epoxides, aziridines, oxazolines, multivalent metal compounds, multifunctional acid anhydrides, phosphate esters, and phosphite esters. These can be used either alone respectively or in combinations with each other.

The isocyanate compound is not especially limited, but is a compound having at least two isocyanate groups per molecule. Examples thereof include: isocyanate compounds such as tolylene diisocyanate (which might be referred to as "TDI"), 4,4'-diphenylmethane diisocyanate (which might be referred to as "MDI"), hexamethylene diisocyanate, xylylene diisocyanate, metaxylylene diisocyanate, 1,5-naphthalene diisocyanate, hydrogenated diphenylmethane diisocyanate, hydrogenated tolylene diisocyanate, hydrogenated xylylene diisocyanate, and isophorone diisocyanate; biuret polyisocyanate compounds such as Sumidur N (produced by Sumitomo-Bayer Urethane Co., Ltd.); polyisocyanate compounds having an isocyanurate ring, such as Desmodur IL and HL (produced by Bayer A. G.) and Colonate EH (produced by Nippon Polyurethane Kogyo Co., Ltd.); adduct polyisocyanate compounds such as Sumidur L (produced by Sumitomo-Bayer Urethane Co., Ltd.); and adduct polyisocyanate compounds such as Colonate HL (produced by Nippon Polyurethane Kogyo Co., Ltd.). These can be used either alone respectively or in combinations with each other. In addition, blocked isocyanates are also usable.

The reaction ratio between the aliphatic polyester and the isocyanate compound is not especially limited. However, for example, the ratio between the isocyanate group in the isocyanate compound and the hydroxyl group in the aliphatic polyester (NCO/OH (molar ratio)) is favorably in the range of 0.5 to 3.0, more favorably 0.8 to 1.5.

Incidentally, if necessary, it is free to use conventional catalysts such as organotin compounds and tertiary amines in order to promote the urethanization reaction of the aliphatic polyester with the isocyanate compound.

The epoxy compound is not especially limited, but is a compound having at least two epoxy groups per molecule. Examples thereof include (poly)ethylene glycol diglycidyl ether, (poly)propylene glycol diglycidyl ether, polytetramethylene glycol diglycidyl ether, resorcin diglycidyl ether, neopentyl glycol diglycidyl ether, 1,6-hexanediol diglycidyl ether, diglycidyl adipate, diglycidyl o-phthalate, diglycidyl terephthalate, hydroquinone diglycidyl ether, bisphenol S diglycidyl ether, glycerol diglycidyl ether, sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl) isocyanurate, glycerol triglycidyl ether, and trimethylolpropane polyglycidyl ether.

The reaction with the epoxy compound is, for example, carried out by a process including the steps of carrying out ring-opening polymerization of the cyclic acid anhydride with the cyclic ether and then carrying out a reaction of the resultant aliphatic polyester with the epoxy compound, or a process including the step of carrying out a simultaneous ring-opening reaction of the cyclic acid anhydride, the cyclic ether, and the epoxy compound, or a process including the steps of carrying out a simultaneous ring-opening reaction of the cyclic acid anhydride, the cyclic ether, and the epoxy compound and then causing the resultant product to further react with the epoxy compound.

Incidentally, if necessary, it is free to use conventional catalysts such as tertiary amines, quaternary ammonium salts, and imidazole compounds in order to promote the reaction of the aliphatic polyester with the epoxy compound.

The aziridine compound is not especially limited, but examples thereof include 2,2'-bishydroxymethylbutanol-tris [3-(1-aziridinyl)propionate], ethylene glycol-bis[3-(1-aziridinyl)propionate], polyethylene glycol-bis[3-(1-aziridinyl)propionate], propylene glycol-bis[3-(1-aziridinyl) propionate], polypropylene glycol-bis[3-(1-aziridinyl) propionate], tetramethylene glycol-bis[3-(1-aziridinyl) propionate], polytetram ethylene glycol-bis[3-(1-aziridinyl) propionate], N,N'-tetramethylenebisethyleneurea, N,N'-pentamethylenebisethyleneurea, N,N'-hexamethylene-bisethyleneurea, N,N'-heptamethylenebisethyleneurea, N,N'-octamethylenebisethyleneurea, N,N'-phenylenebisethyleneurea, N,N'-tolylenebisethyleneurea, N,N'-diphenyl-4,4'-bisethyleneurea, 3.3'-dimethyldiphen 3.3'-dimethoxydiphenyl-4,4'-bisethyleneurea, and diphenylmethane-p,p-bisethyleneurea. These can be used either alone respectively or in combinations with each other.

The amount of the aziridine compound as used is favorably in the range of 0.001 to 10 weight %, more favorably 0.01 to 5 weight %, of the aliphatic polyester.

The oxazoline compound is not especially limited, but examples thereof include 2-oxazoline, 2-methyl-2-oxazoline, 2-ethyl-2-oxazoline, 2-isopropyl-2-oxazoline, 2-butyl-2-oxazoline, 2-phenyl-2-oxazoline, 2,2'-trimethylene-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide, and bis-(2-oxazolinylnorbornane) sulfide. These can be used either alone respectively or in combinations with each other. More favorable are 2,2'-m-phenylene-bis-(2-oxazoline) and bis-(2-oxazolinylnorbornane) sulfide.

The reaction ratio between the aliphatic polyester and the oxazoline compound is not especially limited. However, for example, the ratio between the 2-oxazoline group (Ox) in the oxazoline compound and the carboxyl group (COOH) in the aliphatic polyester (Ox/COOH (molar ratio)) is favorably in the range of 0.5 to 10.0, more favorably 0.8 to 5.0.

Incidentally, if necessary, it is free to use conventional catalysts such as amine salts of acidic compounds in order to promote the reaction of the aliphatic polyester with the oxazoline compound.

The multivalent metal compound is not especially limited, but examples thereof include organometallic compounds, metal salts and/or metal alkoxides having valencies of not less than 2.

Examples of favorable metals in the organometallic compounds and/or metal salts having valencies of not less than 2 include zinc, calcium, copper, iron, magnesium, cobalt, and barium. More favorable examples include multivalent metal compounds of which the counter anions can be separated and recovered as volatiles from the reaction system after neutralization, such as zinc(II) acetylacetonate, zinc acetate, zinc formate, zinc propionate, and zinc carbonate.

Examples of the metal alkoxides include aluminum isopropoxide, mono-sec-butoxyaluminum diisopropylate, aluminum ethylate, tetraisopropoxytitanium, tetra-n-butoxytitanium, tetra(2-ethylhexyloxy)titanium, and tetrastearyloxytitanium.

The reaction ratio between the aliphatic polyester and the multivalent metal compound is not especially limited. However, in the case where a neutralization reaction of the terminal carboxyl group in the aliphatic polyester with the organometallic compound and/or metal salt having a valency of not less than 2 is carried out, for example, the ratio between the metal compound and the carboxyl group in the aliphatic polyester (metal compound/COOH (molar ratio)) is favorably in the range of 0.1 to 2.0, more favorably 0.2 to 1.2.

In the case where a reaction of the terminal hydroxyl group in the aliphatic polyester with the metal alkoxide is carried out, for example, the ratio between the metal compound and the hydroxyl group in the aliphatic polyester (metal compound/OH (molar ratio)) is favorably in the range of 0.1 to 2.0, more favorably 0.2 to 1.2.

The multifunctional acid anhydride is not especially limited, but examples thereof include pyromellitic dianhydride, benzophenonetetracarboxylic dianhydride, butane-1,2,3,4-tetracarboxylic dianhydride, maleic anhydride homopolymers, maleic anhydride-vinyl acetate copolymers, maleic anhydride-ethylene copolymers, maleic anhydride-isobutylene copolymers, maleic anhydride-isobutyl vinyl ether copolymers, maleic anhydride-acrylonitrile copolymers, and maleic anhydride-styrene copolymers.

The reaction with the multifunctional acid anhydride is, for example, carried out by a process including the steps of carrying out ring-opening polymerization of the cyclic acid anhydride with the cyclic ether and then carrying out a reaction of the resultant aliphatic polyester with the multifunctional acid anhydride, or a process including the step of carrying out a simultaneous ring-opening reaction of the cyclic acid anhydride, the cyclic ether, and the multifunctional acid anhydride, or a process including the steps of carrying out a simultaneous ring-opening reaction of the cyclic acid anhydride, the cyclic ether, and the multifunctional acid anhydride and then causing the resultant product to further react with the multifunctional acid anhydride.

The amount of the multifunctional acid anhydride as used is favorably in the range of 0.001 to 10 weight %, more favorably 0.01 to 5 weight %, of the aliphatic polyester.

The phosphate or phosphite ester is not especially limited, but may be either a diester or triester. Examples of the ester group include methyl, ethyl, propyl, butyl, phenyl, and 2-ethylhexyl, but methyl, ethyl, and phenyl are favorable in consideration of the reactivity and the economical advantages.

The amount of the phosphate or phosphite ester as used is favorably in the range of 0.001 to 10 weight %, more favorably 0.01 to 5 weight %, of the aliphatic polyester.

The temperature of the reaction between the chain-extending agent and the aliphatic polyester is favorably in the range of 20 to 250° C., more favorably 100 to 200° C.

The process for the reaction between the chain-extending agent and the aliphatic polyester is not especially limited, but examples thereof include a process including the step of causing the aliphatic polyester to react with the chain-extending agent in a state where the aliphatic polyester is dissolved in a suitable solvent or heat-melted.

The aliphatic polyester (B) as used in the present invention is required to have a number-average molecular weight in the range of 3,000 to 300,000, but this number-average molecular weight is favorably in the range of 25,000 to 200,000, more favorably 40,000 to 150,000.

The biodegradable recycled polyester resin according to the present invention is obtained by a process including the step of carrying out a melting reaction of the recycled aromatic polyester (A) with the aliphatic polyester (B) in a heated state. Examples of the melting reaction include transesterification reactions and reactions with various chain-extending agents. The method involving the above reaction with the chain-extending agent has industrial disadvantages in that: the process involves many steps; unreacted chain-extending agents have an bad influence on safety or cause changes of properties with the passage of time; and the used chain-extending agents cause fisheyes in films.

The number-average molecular weight of the aliphatic polyester (B) needs to be at least 3,000 desirably for preventing the property deterioration which is caused by a randomization reaction between the aliphatic polyester (B) and the aromatic polyester (A) in the melting reaction. In the case where the number-average molecular weight is less than this, the property deterioration is greatly caused by the randomization. Considering the thermal deterioration, the strength, and so on, the number-average molecular weight of the aliphatic polyester (B) is favorably not less than 25,000 and more favorably not less than 40,000. In addition, the increase of the number-average molecular weight to more than 300,000 needs such a long time for the reaction as to be industrially disadvantageous. The number-average molecular weight is not more than 300,000, favorably not more than 200,000, more favorably not more than 150,000, because the long-time reaction increases volatiles as formed due to such as decomposition.

Because the biodegradable recycled polyester resin according to the present invention is obtained by the above melting reaction, this polyester resin has a molecular structure such that the aromatic polyester (A) and the aliphatic polyester (B) are arranged in a block form, and, surprisingly, even the aromatic polyester portions, which have so far been assumed not to biodegrade, do biodegrade.

The reason why even the aromatic polyester portions, which have so far been assumed not to biodegrade, are rendered biodegradable by forming the molecular structure such that the aromatic polyester (A) and the aliphatic polyester (B) are arranged in a block form is not clear, but the present inventors consider this reason to be as follows:

It is considered that the aliphatic polyester portions biodegrade first of the molecules in which the aromatic polyester (A) and the aliphatic polyester (B) are arranged in a block form, and that, as a result, the aromatic polyester portions are dispersed in molecular order, and further that, unlike the simple blend of the aromatic polyester (A) and the aliphatic polyester (B), the above aromatic polyester portions which have been dispersed in molecular order have such an overwhelmingly broadened surface area as to exhibit greatly enhanced reactivity upon enzymes from degradation germs. In addition, it is inferred that when the block is formed, a part of the aromatic polyester portions reduce in molecular weight and are then incorporated into the block polymer, thus becoming still easier to biodegrade.

The mode of the melting reaction is different according to various conditions such as the sorts of the recycled aromatic polyester (A) and the aliphatic polyester (B) (which are reactants), the concentrations of their terminal groups, the sort of the chain-extending agent, and the water content of the reaction system, but generally the melting reaction is carried out at not lower than 150° C., favorably not lower than 200° C., more favorably not lower than 250° C., under any of increased, reduced, and normal pressures in a nitrogen gas stream.

Examples of the chain-extending agents include the aforementioned ones such as isocyanates, epoxides, aziridines, oxazolines, multivalent metal compounds, multifunctional acid anhydrides, phosphate esters, and phosphite esters. These can be used either alone respectively or in combinations with each other.

The reaction ratio between the aliphatic polyester (B) and the aromatic polyester (A) is not especially limited, but is, favorably in respect to such as properties, in the range of 5/95 to 95/5 in terms of weight ratio between the aliphatic polyester and the aromatic polyester. Furthermore, considering the biodegradability, the reaction ratio between the aliphatic polyester (B) and the aromatic polyester (A) is favorably in the range of 51/49 to 95/5, more favorably 65/35 to 95/5, still more favorably 75/25 to 95/5, in terms of weight ratio between the aliphatic polyester and the aromatic polyester.

The biodegradability which the biodegradable recycled polyester resin according to the present invention can exhibit is favorably not less than 20% after 36 months, more favorably not less than 40% after 24 months, in terms of biodegradation ratio which is calculated by the biodegradation test as described in the below-mentioned portion hereof under the heading of "DETAILED DESCRIPTION OF THE PREFERRED EMBODIMENTS".

Conventional apparatuses can be used in order to obtain the biodegradable recycled polyester resin according to the present invention.

Examples of tower type reaction apparatuses include reaction vessels comprising Herical ribbon wings and transformational spiral baffles.

Examples of sideways type reaction apparatuses include sideways type single- or twin-shaft kneaders comprising agitation shafts which have a row of transformational wings and are arranged in parallel to each other.

In addition, the reaction apparatus may be either a batch type or a continuous type. Examples of the batch type apparatus include Max Blend Wing Type Reactor (produced by Sumitomo Heavy Machine Co., Ltd.), Super Blend Wing Type Reactor (produced by Sumitomo Heavy Machine Co., Ltd.), Reverse-Cone Ribbon Wing Type Reactor (produced by Mitsubishi Heavy Industries Co., Ltd.), and Spiral Lattice-Shaped Wing Type Reactor (Hitachi Seisakusho Co., Ltd.). Examples of the continuous type apparatus include BIVOLAK (produced by Sumitomo Heavy Machine Co., Ltd.), Hitachi Spectacles-Shaped Wing Polymerization Machine (produced by Hitachi Seisakusho Co., Ltd.), Hitachi Lattice-Shaped Wing Polymerization Machine (produced by Hitachi Seisakusho Co., Ltd.), Self-Cleaning Type Reactor (produced by Mitsubishi Heavy Industries Co., Ltd.), Twin-Shaft Sideways Type Reactor (produced by Mitsubishi Heavy Industries Co., Ltd.), KRC Kneader (produced by Kurimoto Co., Ltd.), TEX-K (The Japan Steel Work Co., Ltd.), and single-or twin-screw extruders widely used for such as extrusion molding or devolatilization of plastics. Of these, particularly, the twin-shaft kneader is used most favorably for causing the aliphatic polyester (B) and the recycled aromatic polyester (A) to make a melting reaction together.

In the present invention, a 0.2-mm-thick film of the polyester resin as obtained by the reaction between the aliphatic polyester (B) and the aromatic polyester (A) exhibits a value of tensile elastic modulus in the range of favorably 0.98 to 9,800 $N/mm^2$, more favorably 9.8 to 980 $N/mm^2$, still more favorably 98 to 980 $N/mm^2$, wherein the film is prepared with a compression molding machine under conditions of 260° C., 1,470 $N/cm^2$, and 2 minutes, and wherein the tensile elastic modulus is measured in accordance with ASTM-D882-90 (method A). In the case where the tensile elastic modulus is less than 0.98 $N/mm^2$, the film does not have moderate firmness and is therefore difficult to handle. In the case where the tensile elastic modulus is more than 9,800 $N/mm^2$, the film is not so soft as to have characteristics as a wrapping material.

If necessary, phosphorus-based compounds, sulfur ester-based compounds, hindered phenol-based compounds, or hindered amine-based compounds can be added in order to inhibit and prevent the randomization reaction of the aliphatic polyester (B) with the aromatic polyester (A).

If necessary, other components can be added to the biodegradable recycled polyester resin as obtained in the above way. Examples of such other components include nucleating agents, pigments, dyes, heat-resisting agents, antioxidants, weather-resisting agents, lubricants, antistatic agents, stabilizers, fillers, reinforcements, fire retardants, plasticizers, and other polymers. The amount of these other components is in the range that does not spoil the effects of the present invention.

The biodegradable recycled polyester resin according to the present invention can be used in the form of a polyester resin composition in which the biodegradable recycled polyester resin is combined with the recycled aromatic polyester (A), the aliphatic polyester (B), both of which are unreacted residues, or the above additives, such as nucleating agents, in the range that does not spoil the effects of the present invention, wherein the ratio of the biodegradable recycled polyester resin in the polyester resin composition is favorably not less than 80 weight %, more favorably not less than 90 weight %, of the polyester resin composition.

The biodegradable recycled polyester resin according to the present invention exhibits not only little burden to environment, but also good moldability. Therefore, this polyester resin can be applied to conventional molding methods such as extrusion molding, injection molding, hollow molding and vacuum molding, and can be formed into molded products such as various parts, receptacles, materials, tools, films, sheets and fibers.

(Effects and Advantages of the Invention):

The present invention can afford biodegradability to the aromatic polyester, which has so far been assumed to have no biodegradability, and further can provide a biodegradable recycled polyester resin which is inexpensive and economical due to use of recycled aromatic polyesters, wherein the biodegradable recycled polyester resin can effectively be used for such as wrapping materials and daily necessaries and general goods, and further can also solve problems of wastes by biodegradation.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited thereto. Incidentally, in the examples, the unit "part(s)" denotes "part(s) by weight". The evaluation methods performed in the examples are as follows. The results thereof are compiled in Tables 1 and 2.

(Molecular Weight):

The number-average molecular weight was measured in terms of polystyrene by gel permeation chromatography.

(Melting Point):

First, 20 mg of a sample was retained in a melted state at 280° C. under a nitrogen gas stream for 5 minutes with a DSC (SSC5200 model, produced by Seiko Electronic Industry Co., Ltd.), and then rapidly cooled with liquid nitrogen. The endothermic peak temperature on the basis of crystal melting in the process of raising the temperature of this sample at a speed of 6° C./minute was taken as the melting point.

(Tensile Test):

A film having a thickness of 0.2 mm was prepared with a compression molding machine under conditions of 260° C., 1,470 $N/cm^2$, and 2 minutes, and then measured by fracture strength, fracture elongation, and tensile elastic modulus in accordance with ASTM-D882-90 (method A).

(Biodegradability Test):

A film having a thickness of 0.2 mm was prepared with a compression molding machine under conditions of 260° C., 1,470 $N/cm^2$, and 2 minutes. The resultant film was buried into a planter as filled with soil. While being sprinkled with water once a day, the planter was preserved in an isothermal and isohumid room of 23° C. and relative humidity 65%. Every predetermined time, the film was got out and then washed with water, and thereafter water on the surface of the film was dried, and the resultant dry film was weighed to calculate the biodegradation ratio according to the below-mentioned equation.

Incidentally, the soil as used was a mixture of two kinds of soil, as collected at Onobara, Minoo-shi, Japan and at Otabi-cho, Suita-shi, Japan respectively, with leaf mold in a ratio of 3:1:3.

Biodegradation ratio (%)=(weight of film after predetermined time)/(weight of film before burial)

EXAMPLE 1

First, 216.0 parts of succinic anhydride, 108.0 parts of toluene, and 2.47 parts of a zirconyl octylate solution (zirconium content=12 weight %) were placed into an autoclave having a capacity of 1 liter, of which the internal air was then replaced with nitrogen. Next, under stirring, the autoclave was heated gradually to 130° C. to melt the succinic anhydride. While the pressure in the autoclave was maintained in the range of 0.29 to 0.82 MPa at the same temperature as the above, 133.1 parts of ethylene oxide was continuously introduced at a feeding rate of 26.6 parts per hour over a period of 5.0 hours. After the introduction of the ethylene oxide had been completed, an aging reaction was carried out at 130° C. for 1.0 hour, and then the system was allowed to revert to normal pressure with the internal temperature left maintained at 130° C. After nitrogen had been blown in, the internal pressure of the system was reduced to 133 Pa, thus obtaining an aliphatic polyester (1), which had a number-average molecular weight of 16,400, as determined by the GPC measurement, and a melting point of 98° C. as measured with the DSC.

A flask was charged with 75.0 parts of the resultant aliphatic polyester (1) and 25.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (1).

The measurement of the biodegradation ratio of the biodegradable recycled polyester resin (1) exhibited a value of 100% after 12 months. As a result, it was found that not only the aliphatic polyester (1) but also the aromatic polyester (1) biodegraded.

EXAMPLE 2

A flask was charged with 67.0 parts of the aliphatic polyester (1), as obtained in Example 1, and 33.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (2).

EXAMPLE 3

A flask was charged with 51.0 parts of the aliphatic polyester (1), as obtained in Example 1, and 49.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (3).

EXAMPLE 4

A flask was charged with 25.0 parts of the aliphatic polyester (1), as obtained in Example 1, and 75.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (4).

EXAMPLE 5

First, 35.2 parts of succinic anhydride, 17.1 parts of toluene, and 0.401 parts of a zirconyl octylate solution (zirconium content=12 weight %) were placed into an autoclave having a capacity of 100 liters, of which the internal air was then replaced with nitrogen. Next, under stirring, the autoclave was heated gradually to 130° C. to melt the succinic anhydride. While the pressure in the autoclave was maintained in the range of 0.29 to 0.66 MPa at the same temperature as the above, 17.82 parts of ethylene oxide was continuously introduced at a feeding rate of 3.56 parts per hour over a period of 5.0 hours. After the introduction of the ethylene oxide had been completed, an aging reaction was carried out at 130° C. for 1.0 hour, and then the system was allowed to revert to normal pressure with the internal temperature left maintained at 130° C. After nitrogen had been blown in, the toluene was devolatilized and the internal pressure of the system was reduced to 133 Pa, thus obtaining a polymerized product, which had a number-average molecular weight of 18,000, as determined by the GPC measurement, and a melting point of 98° C. as measured with the DSC.

Subsequently, under a nitrogen atmosphere, 50.0 parts of the resultant polymerized product was transferred into another SUS-made reactor having a capacity of 100 liters, to which 1.14 parts of hexamethylene diisocyanate was then added to carry out a reaction under conditions of jacket temperature=180° C. for 1.5 hours, thus obtaining an aliphatic polyester (5), which had a number-average molecular weight of 72,000 as determined by the GPC measurement.

A flask was charged with 75.0 parts of the resultant aliphatic polyester (5) and 25.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (5).

EXAMPLE 6

A flask was charged with 67.0 parts of the aliphatic polyester (5), as obtained in Example 5, and 33.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (6).

EXAMPLE 7

First, 300.0 parts of succinic anhydride (purity=99.8%; produced by Lonza Co., Ltd.) and 1.643 parts of zirconocene dichloride (purity=not less than 97%; produced by Tokyo Kasei Kogyo Co., Ltd.) were placed into an autoclave which had been dried by sufficient displacement of internal air with nitrogen and was equipped with a stirrer for high viscosity and had a capacity of 1 liter. The internal air of the autoclave was then replaced with nitrogen. Next, under stirring, the autoclave was heated gradually to 130° C. to melt the succinic anhydride. While the pressure in the autoclave was maintained in the range of 0.29 to 0.66 MPa at the same temperature as the above, 158.6 parts of ethylene oxide (purity=not less than 99.9%; produced by Nippon Shokubai Co., Ltd.) was continuously introduced at a feeding rate of 15.9 parts per hour over a period of 10.0 hours. After the introduction of the ethylene oxide had been completed, an aging reaction was carried out at 130° C. for 1.5 hours, and then the system was allowed to revert to normal pressure with the internal temperature left maintained at 130° C., thus obtaining an aliphatic polyester (7), which had a number-average molecular weight of 28,000, as determined by the GPC measurement, and a melting point of 94.4° C. as measured with the DSC.

A flask was charged with 67.0 parts of the resultant aliphatic polyester (7) and 33.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (7).

The measurement of the biodegradation ratio of the biodegradable recycled polyester resin (7) exhibited a value of 100% after 36 months. As a result, it was found that not only the aliphatic polyester (7) but also the aromatic polyester (1) biodegraded.

EXAMPLE 8

A flask was charged with 51.0 parts of the aliphatic polyester (7), as obtained in Example 7, and 49.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (8).

EXAMPLE 9

First, 300.0 parts of succinic anhydride (purity=99.8%; produced by Lonza Co., Ltd.), 1.45 parts of zirconyl octylate (produced by Daiichi Kigenso Kagaku Kogyo Co., Ltd.; acid content=not more than 0.008 mol % of the succinic anhydride; water content=not more than 0.02 mol % of the succinic anhydride) (which had been dried by dehydration with calcium hydride and then filtered), and 30 parts of cyclohexane (which had been dried with molecular sieves) were placed into an autoclave which had been dried by sufficient displacement of internal air with nitrogen and was equipped with a stirrer for high viscosity and had a capacity of 1 liter. The internal air of the autoclave was then replaced with nitrogen. Next, under stirring, the autoclave was heated gradually to 130° C. to melt the succinic anhydride. While the pressure in the autoclave was maintained in the range of 0.29 to 0.66 MPa at the same temperature as the above, 145.36 parts of ethylene oxide (purity=not less than 99.9%; produced by Nippon Shokubai Co., Ltd.) was continuously introduced at a feeding rate of 22.36 parts per hour over a period of 6.5 hours. After the introduction of the ethylene oxide had been completed, an aging reaction was carried out at 130° C. for 1.5 hours, and then the system was allowed to revert to normal pressure with the internal temperature left maintained at 130° C. After nitrogen had been blown in, the cyclohexane was devolatilized and the internal pressure of the system was reduced to 133 Pa, thus obtaining an aliphatic polyester (9), which had a number-average molecular weight of 42,300, as determined by the GPC measurement, and a melting point of 104.2° C. as measured with the DSC.

A flask was charged with 67.0 parts of the resultant aliphatic polyester (9) and 33.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (9).

The measurement of the biodegradation ratio of the biodegradable recycled polyester resin (9) exhibited a value of 100% after 36 months. As a result, it was found that not only the aliphatic polyester (9) but also the aromatic polyester (1) biodegraded.

EXAMPLE 10

A flask was charged with 51.0 parts of the aliphatic polyester (9), as obtained in Example 9, and 49.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a biodegradable recycled polyester resin (10).

Comparative Example 1

A flask was charged with 3.0 parts of the aliphatic polyester (1), as obtained in Example 1, and 97.0 parts of a recycled aromatic polyester (1) (produced by Yono Pet Bottle Recycle Co., Ltd.), and then a reaction therebetween was carried out under conditions of reduced pressure (in the range of 13.3 to 26.6 Pa) and 280° C. in a nitrogen gas stream for 1.0 hour, thus obtaining a comparative polyester resin (1).

Comparative Example 2

A comparative polyester resin (2) was obtained in the same way as of Comparative Example 1 except that the aliphatic polyester (1) was not used at all, and that only the recycled aromatic polyester (1) was used as the polyester.

TABLE 1

|  | Example 1 | Example 2 | Example 3 | Example 4 | Example 5 | Example 6 |
|---|---|---|---|---|---|---|
| Number-average molecular weight of aliphatic polyester | 16,400 | 16,400 | 16,400 | 16,400 | 72,000 | 72,000 |
| Aliphatic polyester: aromatic polyester (weight ratio) | 75:25 | 67:33 | 51:49 | 25:75 | 75:25 | 67:33 |
| Melting point (° C.) | — | — | — | — | — | — |
| Fracture strength (kgf/cm$^2$) | 110 | 100 | 170 | 260 | 180 | 160 |
| Fracture elongation (%) | 530 | 670 | 590 | 410 | 600 | 620 |
| Tensile elastic modulus (kgf/mm$^2$) | 14 | 1.0 | 1.0 | 76 | 13 | 1.1 |

TABLE 1-continued

|  | Example 1 | Example 2 | Example 3 | Example 4 | Example 5 | Example 6 |
|---|---|---|---|---|---|---|
| Biodegradation ratio (%) | | | | | | |
| After 6 months | 35 | 3 | 0 | 0 | 20 | 0 |
| After 12 months | 100 | 14 | 0 | 0 | 85 | 10 |
| After 24 months |  | 48 | 1 | 0 | 100 | 42 |
| After 36 months |  | 100 | 26 | 2 |  | 75 |
| After 48 months |  |  | 66 | 3 |  | 100 |
| After 60 months |  |  | 93 | 3 |  |  |

TABLE 2

|  | Example 7 | Example 8 | Example 9 | Example 10 | Comparative Example 1 | Comparative Example 2 |
|---|---|---|---|---|---|---|
| Number-average molecular weight of aliphatic polyester | 28,000 | 28,000 | 42,300 | 42,300 | 16,400 | — |
| Aliphatic polyester: aromatic polyester (weight ratio) | 67:33 | 51:49 | 67:33 | 51:49 | 3:97 | Recycled aromatic polyester (1) |
| Melting point (° C.) | — | — | — | — | 240 | 256 |
| Fracture strength (kgf/cm$^2$) | 140 | 210 | 155 | 230 | 420 | 460 |
| Fracture elongation (%) | 580 | 570 | 600 | 600 | 8 | 5 |
| Tensile elastic modulus (kgf/mm$^2$) | 1.2 | 1.3 | 1.1 | 1.2 | 110 | 125 |
| Biodegradation ratio (%) | | | | | | |
| After 6 months | 0 | 0 | 0 | 0 | 0 | 0 |
| After 12 months | 12 | 0 | 11 | 0 | 0 | 0 |
| After 24 months | 45 | 0 | 43 | 0 | 0 | 0 |
| After 36 months | 100 | 23 | 100 | 22 | 0 | 0 |
| After 48 months |  | 58 |  | 55 | 0 | 0 |
| After 60 months |  | 89 |  | 80 | 0 | 0 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A biodegradable recycled polyester resin, which is obtained by a process including the step of carrying out a reaction of a recycled aromatic polyester (A) with an aliphatic polyester (B) having a number-average molecular weight of 3,000 to 300,000 in a reaction ratio (weight ratio) of (A)/(B)=95/5 to 5/95, thereby affording biodegradability to the recycled aromatic polyester (A), wherein the aliphatic polyester (B) is obtained from an aliphatic dicarboxylic acid component having 2 to 6 carbon atoms and an aliphatic glycol component having 2 to 4 carbon atoms.

2. A biodegradable recycled polyester resin according to claim 1, wherein the aliphatic polyester (B) is obtained by a process including the step of carrying out ring-opening copolymerization of a cyclic acid anhydride (C) and a cyclic ether (D), wherein the cyclic acid anhydride (C) includes succinic anhydride as a major component, and wherein the cyclic ether (D) includes ethylene oxide as a major component.

3. A biodegradable recycled polyester resin according to claim 1, which has a structure such that the recycled aromatic polyester (A) and the aliphatic polyester (B) are arranged in a block form.

4. A biodegradable recycled polyester resin according to claim 2, which has a structure such that the recycled aromatic polyester (A) and the aliphatic polyester (B) are arranged in a block form.

5. A production process for a biodegradable recycled polyester resin, which comprises the step of carrying out a melting reaction of a recycled aromatic polyester (A) with an aliphatic polyester (B) in a heated state in a reaction ratio (weight ratio) of (A)/(B)=95/5 to 5/95, wherein the aliphatic polyester (B) ham a number-average molecular weight of 3,000 to 300,000, and wherein the aliphatic polyester (B) is obtained from an aliphatic dicarboxylic acid component having 2 to 6 carbon atoms and an aliphatic glycol component having 2 to 4 carbon atoms.

* * * * *